April 28, 1964     L. PAZMANY     3,130,941
ELASTIC BELLMOUTH FOR DUCT THROUGH AERODYNAMIC SURFACE
Filed March 27, 1963     2 Sheets-Sheet 1

INVENTOR.
LADISLAO PAZMANY
BY
*Knox & Knox*

April 28, 1964 L. PAZMANY 3,130,941
ELASTIC BELLMOUTH FOR DUCT THROUGH AERODYNAMIC SURFACE
Filed March 27, 1963 2 Sheets-Sheet 2

INVENTOR.
LADISLAO PAZMANY
BY
*Knox & Knox*

United States Patent Office 3,130,941
Patented Apr. 28, 1964

3,130,941
ELASTIC BELLMOUTH FOR DUCT THROUGH AERODYNAMIC SURFACE
Ladislao Pazmany, San Diego, Calif., assignor to Ryan Aeronautical Co., San Diego, Calif.
Filed Mar. 27, 1963, Ser. No. 268,235
14 Claims. (Cl. 244—12)

The present invention relates to aircraft and more specifically to an elastic bellmouth for a duct containing a fan or propeller means.

The primary object of this invention is to provide a duct structure for an aircraft ducted fan or the like, wherein the entry end of the duct has an annulus or rim portion which can be extended into a smoothly curved bellmouth to improve airflow into the duct at low speeds or in vertical flight and, alternatively retracted to conform with the normal contours of the structure surrounding the duct.

A further object of this invention is to provide a duct structure particularly suitable for incorporation into the thin wing of a high speed aircraft, the retracted bellmouth portion causing no obstruction to high speed flight but greatly increasing fan efficiency and lift when extended into a bellmouth.

With these and other objects in view, this invention consists in the novel construction, combination and arrangement of elements and portions, as will be hereinafter described in the specification, particularly pointed out in the claims and illustrated in the drawings which form a material part of this disclosure, and in which:

Similar characters of reference indicate similar or identical elements and portions throughout the specification and throughout the view of the drawing.

*Structure*

Figure 1:
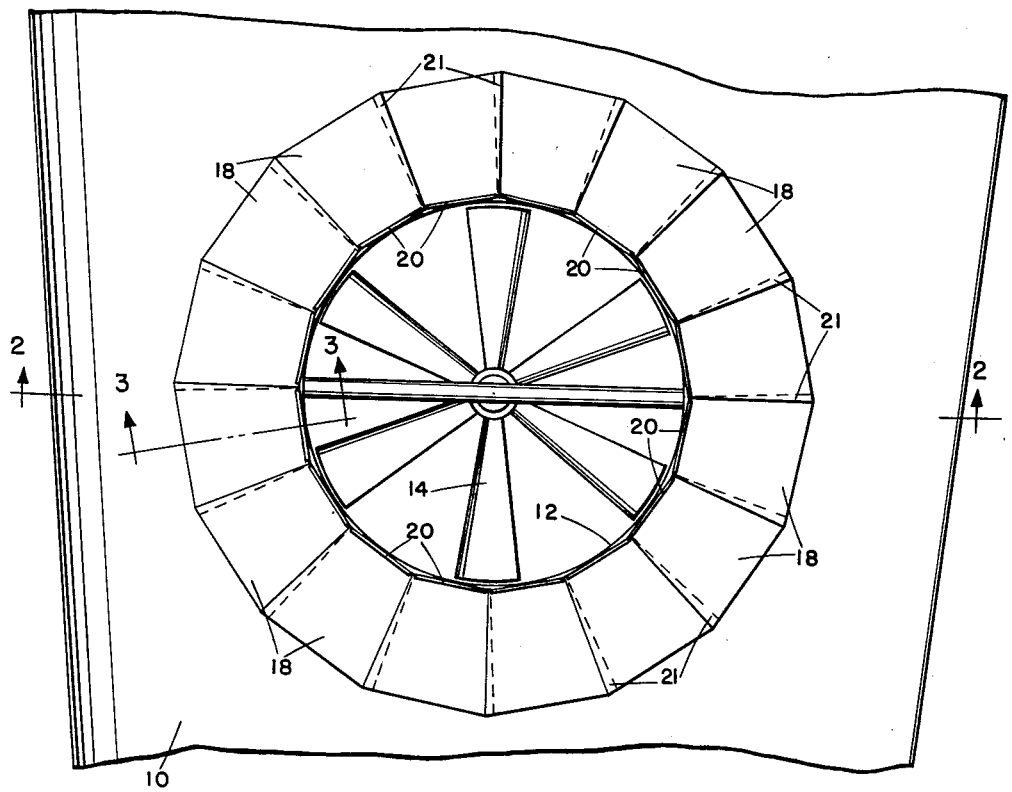
FIGURE 1 is a top plan view of part of an aircraft wing incorporating the bellmouth structure around a duct.
Figure 2:
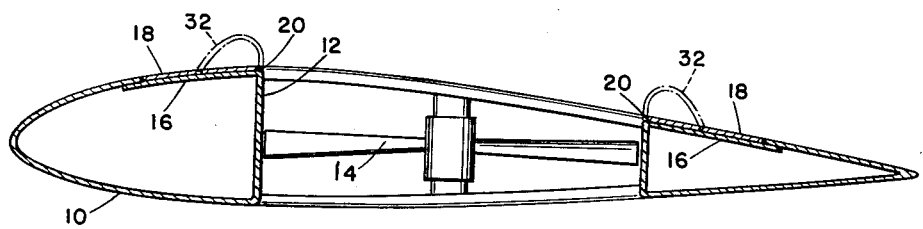
FIGURE 2 is a sectional view taken on line 2—2 of FIGURE 1.
Figure 3:
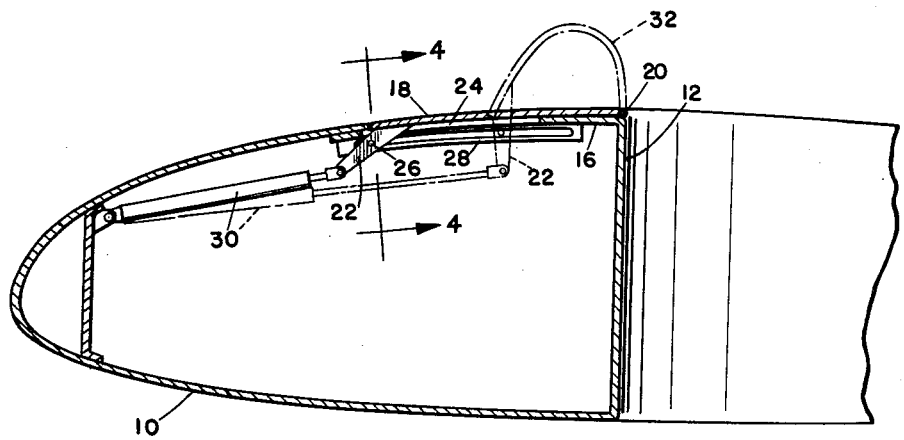
FIGURE 3 is an enlarged fragmentary sectional view taken on line 3—3 of FIGURE 1.

Referring now to FIGURES 1–4 of the drawings, the structure is illustrated as incorporated into an aircraft wing 10 having a circular duct 12 extending vertically through the wing. In the duct 12 is a fan 14 mounted and driven in any suitable manner to provide lift and propulsive thrust. The general arrangement and operation of such a ducted fan system is well known and need not be described in detail.

The upper surface of wing 10 surrounding duct 12 has a shallow, annular recessed portion 16 in which are a plurality of flexible and resilient petal elements 18 extending radially from said duct. Each petal element 18 is pivotally attached at its inner edge to wing 10 by a hinge 20 at the upper rim of duct 12. In retracted or relaxed position the petals 18 form part of the upper wing surface and do not interfere with the normal aerodynamic characteristics. The petal elements are preferably of thin sheet metal or comparable material and have slightly overlapped edges, as indicated at 21 in FIGURE 1, to prevent jamming of adjacent edges when the petals are actuated. At the outer end of each petal element 18 is an arm 22 extending downwardly through a radial slot 24 in the recessed portion 16, the arm having a transverse guide pin 26 which rides in a radial track 28 on the underside of said recessed portion. Connected between the arm 22 and the main structure of wing 10 is a radially extending telescopic jack 30 of any suitable type. For simplicity, one such jack could be connected to a group of arms 22 to actuate several petals simultaneously. Other mechanisms may be used to slide arms 22 along the tracks 28, the jack arrangement merely being an example.

Vanes, covers, or other structure, usually mounted in the duct to control airflow, have been omitted for clarity, since their function is not a part of the present invention.

*Operation*

In normal forward flight at high speed the fan 14 is not in use and the duct 12 would be enclosed in a suitable manner for minimum drag. The retracted petals 18 are contained within the wing contours and do not detract from performance. In slow, hovering, or vertical flight the fan is used to provide vertical thrust to support the aircraft. However, at low airflow speeds a sharp duct entry is inefficient and creates considerable turbulence, a large radius or smoothly curved entry being desirable for smooth flow. Such a curved entry requires a considerable axial length of duct and is impractical in a thin wing, since insufficient length of duct would remain for proper fan operation.

With the structure illustrated an efficiently curved entry or bellmouth can be formed around the duct 12 by actuating jacks 30 to push the arms 22 radially inwardly. This action pushes the outer portions of petal elements 18 inwardly and causes the petal elements to bow axially to said duct to form a bellmouth 32, as indicated in broken line in FIGURES 2 and 3. The guide pins 26 riding in tracks 28 ensure that the outer edges of the petal elements are held down against the recessed portion 16 to form a proper bellmouth. In addition to improving airflow into the duct at low speeds, the bellmouth 32 provides aerodynamic lift due to the air moving over the convex surface which is raised above the wing contour.

*Modified Structure*

Figure 5:
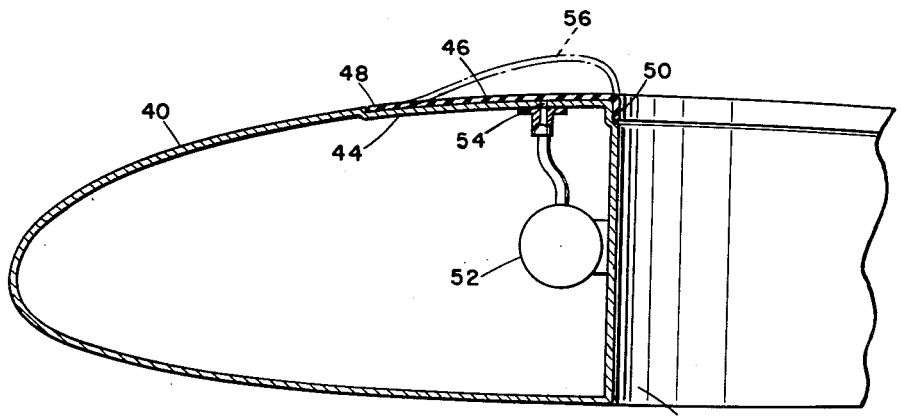
FIGURE 5 is a sectional view similar to FIGURE 3, showing an alternative bellmouth arrangement.

In instances where the multiple petal configuration may be undesirable for various reasons, the structure illustrated in FIGURE 5 may be used to obtain comparable results. The wing 40, duct 42 and annular recessed portion 44 in the top surface are similar to the arrangement described above. Fitted into the recessed portion 44, however, is an annulus in the form of an elastic panel 46 of sheet material such as rubber or similar material, sealed to said recessed portion at the outer edge 48 and sealed to the duct rim at inner edge 50. Within the wing 40, or at some other convenient location, is a pressure source 52, such as an air pump or pressure reservoir, which is connected to an inlet 54 in the recessed portion 44 below panel 46.

Figure 4:
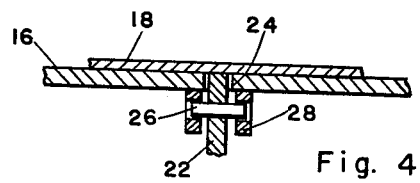
FIGURE 4 is an enlarged sectional view taken on line 4—4 of FIGURE 3.

When pressurized air or other gas is admitted under the panel 46, said panel is inflated and stretched axially to said duct to form a bellmouth 56, and may be thought of as pivoting in a manner equivalent to the action of the petal elements 18, as indicated in broken line in FIGURES 4 and 5. The aerodynamic effect is similar to that of the petal structure.

It is understood that minor variation from the form of the invention disclosed herein may be made without departure from the spirit and scope of the invention, and that the specification and drawings are to be considered as merely illustrative rather than limiting.

I claim:

1. In combination with an aerodynamic surface having an airflow conducting duct extending therethrough, airflow controlling means comprising:
   a flexible, resilient annulus secured to said aerodynamic surface and to the periphery of said duct and extending radially outwardly therefrom;
   and means to bow said annulus principally in a direction axial to said duct to form an axially extended curved bellmouth entry for the duct.

2. Apparatus according to claim 1 wherein said annulus is constructed of flexible, resilient sheet material.

3. Apparatus according to claim 2 wherein said annulus is elastic.

4. Apparatus according to claim 2 wherein said annulus is circumferentially segmented into a plurality of petal elements.

5. Apparatus according to claim 4 wherein said petal elements overlap circumferentially.

6. Apparatus according to claim 4 wherein said petal elements are pivotally secured to the rim of said duct, said means being secured to the radially outer ends of said petal elements and being capable of forcing said outer ends toward said rim.

7. In combination with an aerodynamic surface having an airflow conducting duct extending therethrough, airflow controlling means comprising:
an annular recessed portion in said surface around said duct;
a flexible, resilient radially extending annulus peripherally attached to said duct and being seated in said recessed portion in one position and forming a continuation of said surface;
and means to bow said annulus in a direction axial to said duct from said surface to form an axially extended curved bellmouth entry for the duct.

8. The combination according to claim 7 wherein said annulus comprises a plurality of radially extending petal elements pivotally attached at their inner edges to the periphery of said duct.

9. The combination according to claim 7 wherein said annulus comprises an inflatable panel.

10. In combination with an aircraft wing having a generally circular airflow conducting duct extending through the wing, airflow control means comprising:
an annular recessed portion in the upper surface of said wing extending radially from said duct;
a plurality of flexible, resilient radially extending petals pivotally attached at their inner ends to the periphery of said duct and being seated in said recessed portion in one position, forming a continuation of the upper surface of said wing;
and means to bow said petals axially to said duct to form a curved bellmouth entry for said duct.

11. In combination with an aerodynamic surface having an airflow conducting duct extending therethrough, airflow controlling means comprising:
a flexible, resilient annulus secured to the periphery of said duct and extending radially outwardly therefrom, said annulus being circumferentially segmented into a plurality of petal elements;
and means to bow said annulus axially to said duct to form a curved bellmouth entry for the duct.

12. An aircraft wing having an airflow conducting duct extending vertically therethrough;
a flexible, resilient annulus mounted on said wing at the periphery of said duct for effective pivotal adjustment to a position extending the mouth of said duct principally in a direction axial to said duct; and
means to move said annulus to and from said position.

13. Apparatus according to claim 12 wherein said annulus is flexible, resilient sheet material.

14. Apparatus according to claim 12 wherein said annulus is circumferentially segmented into a plurality of similar petal elements.

References Cited in the file of this patent
UNITED STATES PATENTS

| | | |
|---|---|---|
| 2,948,111 | Nelson | Aug. 9, 1960 |
| 3,080,137 | Hurel | Mar. 5, 1963 |
| 3,083,934 | Vanderlip | Apr. 2, 1963 |